Patented Aug. 24, 1954

2,687,341

UNITED STATES PATENT OFFICE 2,687,341

PRODUCTION OF CRYOLITE

Isadore Mockrin, Philadelphia, Pa., assignor to The Pennsylvania Salt Manufacturing Company, Philadelphia, Pa., a corporation of Pennsylvania No Drawing. Application August 30, 1952,
Serial No. 307,376

2 Claims. (Cl. 23—88)

This invention relates to the production of synthetic cryolite and more particularly to the production of synthetic cryolite through the reaction, in an aqueous medium, of ammonium fluoride, sodium sulfate and aluminum sulfate.

In the production of synthetic cryolite it is generally desirable to use available and relatively inexpensive raw materials in order to successfully compete with the price of the natural product. An economic process using fluorspar is, therefore, highly desirable. Synthetic cryolite may be prepared from fluorspar by first reacting the fluorspar with ammonium sulfate to prepare ammonium fluoride and then reacting the ammonium fluoride in an aqueous medium with sodium sulfate and aluminum sulfate to give cryolite and ammonium sulfate. However, when attempts are made to carry out this reaction by adding aqueous solutions of sodium and aluminum sulfates to solutions of ammonium fluoride, the cryolite precipitate formed is bulky, settles slowly in the liquid reaction medium and is difficult to filter from the solution. As a result, the process is unsatisfactory for the commercial production of synthetic cryolite.

I have now discovered that if the sodium sulfate and aluminum sulfate are first dissolved in the aqueous reaction medium and the ammonium fluoride solution then slowly added, the cryolite product settles rapidly and is readily filtered. As a result, synthetic cryolite can be readily and economically produced by the reaction in an aqueous medium of ammonium fluoride, sodium sulfate and aluminum sulfate. Since ammonium fluoride is readily produced from fluorspar through the reaction of ammonium sulfate on fluorspar, the discovery makes it possible to readily and economically produce cryolite from fluorspar in accordance with the following reactions:

$$CaF_2 + (NH_4)_2SO_4 \rightarrow 2NH_4F + CaSO_4$$

$$12NH_4F + 3Na_2SO_4 + Al_2(SO_4)_3 \rightarrow$$
$$2Na_3AlF_6 + 6(NH_4)_2SO_4$$

In practicing the present invention, the aluminum sulfate and sodium sulfate are first dissolved in water, preferably in a molar ratio of approximately 3 to 4 moles sodium sulfate per mole aluminum sulfate and an aqueous solution of ammonium fluoride then slowly added. The solution temperature, on the addition of the sodium sulfate, should preferably be in the range of 60° to 90° C. It is generally desired to add sufficient ammonium fluoride to completely react with the sodium sulfate and aluminum sulfate present. However, since the cryolite formed precipitates out of the solution and is the only insoluble ingredient, lesser or greater amounts than the stoichiometrical amount may be added if desired. If the ammonium fluoride is added to the solution prior to or along with the other reactants, difficulty is encountered in separating the cryolite product from the solution due to its tendency to remain in suspension and its physical characteristics which make the precipitate extremely difficult to filter. Also, the cryolite product obtained is not of as high a degree of purity as that obtained by carrying out the reaction by adding the ammonium fluoride last.

By carrying out the reaction in accordance with the present invention, yields of cryolite of approximately 97% of the theoretical can be obtained. When the dried product (dried by heating to 110° C.) was heated at 600° C. for 60 minutes, a loss in weight of only 1.8% occurred which is low as compared with the loss in weight generally shown by cryolite products prepared by reactions in aqueous mediums. This is an important advantage in the present process since, particularly for the production of aluminum, cryolites of low water content are highly desirable. Heating at 600° C. also resulted in a large decrease in volume of the cryolite product obtained by the present process, the final volume occupied by the powder being about one-half of the original volume.

The following examples will help to further illustrate the practice of the present invention. In the example and throughout the specification and claims where the term "parts" is used, the parts are parts by weight.

*Example 1*

C. P. grades of $NH_4F$, $Al_2(SO_4)_3 \cdot 18H_2O$, and $Na_2SO_4$ were used in stoichiometric amounts according to the equation:

$$12NH_4F + Al_2(SO_4)_3 \cdot 18H_2O + 3Na_2SO_4 \rightarrow$$
$$2Na_3AlF_6 + 6(NH_4)_2SO_4 + 18H_2O$$

The $Na_2SO_4$ (15.2 parts) and $Al_2(SO_4)_3 \cdot 18H_2O$ (23.8 parts) were dissolved in 150 parts water and then heated to 70° to 90° C. A solution of 15.8 parts of $NH_4F$ in water was then slowly added to the sulfate solution, with mechanical stirring throughout. The total addition time was 17 minutes. A precipitate formed during the addition of the ammonium fluoride solution, the precipitate settling rapidly on formation. After complete addition of the ammonium fluoride, the solution was cooled and the precipitate was removed by filtering and then washed. Filtering occurred readily with no difficulty. The insoluble washed precipitate was then dried at 110° C. The weight of the product, which was identified as $Na_3AlF_6$, was 97% of the calculated theoretical amount.

Where fluorspar is used as a raw material for the production of cryolite in accordance with my present invention, the fluorspar is reacted with ammonium sulfate by heating substantially dry mixtures of the reactants to temperatures of 300° C. to 600° C. Though the desired reaction will proceed at temperatures within this range, I have found that the best results with respect to completeness and rate of reaction will be obtained if the reaction is carried out at a temperature within the range of about 350° to 400° C. This is readily illustrated by the following table:

| Temperature, ° C. | Time for complete Reaction, Hrs. | Percent Completion |
|---|---|---|
| 350 | 21 | 87 |
| 375 | 5 to 6 | 75 |
| 400 | 2 | 69 |
| 450 | 1 | 60 |
| 500 | 1 | 51 |

It was also found that the per cent conversion to ammonium fluoride could be further increased by using an excess of ammonium sulfate. Thus, for example, 20% excess ammonium sulfate increased the conversion to ammonium fluoride by about 12 to 13% at 375° to 400° C.

The ammonium fluoride formed by the reaction of the fluorspar and ammonium sulfate is condensed. Any $NH_3$ and HF which results from $NH_4F$ dissociation are recovered in water. A solution of ammonium fluoride and the recovered $NH_3$ and HF is then added to an aqueous solution of sodium sulfate and aluminum sulfate as heretofore described to produce cryolite and ammonium sulfate. After removal of the precipitated cryolite, the ammonium sulfate can be obtained from the solution, if desired, by evaporation of the water and the ammonium sulfate thus produced reacted with fresh batches of fluorspar.

Having thus described my invention, I claim:

1. The method of making synthetic cryolite comprising preparing ammonium fluoride by heating a substantially dry, finely divided mixture of fluorspar and ammonium sulfate to a temperature of 300° to 600° C., preparing an aqueous solution of said ammonium fluoride, adding said ammonium fluoride solution to an aqueous solution of sodium sulfate and aluminum sulfate to form a cryolite precipitate and ammonium sulfate, separating said cryolite from said ammonium sulphate, drying said ammonium sulphate and reacting said ammonium sulphate with fresh amounts of fluorspar to produce more ammonium fluoride.

2. The method of making synthetic cryolite comprising heating a substantially dry, finely divided mixture of fluorspar and ammonium sulfate to a temperature of 350° to 400° C. to give ammonium fluoride vapors and calcium sulfate, condensing said ammonium fluoride and forming an aqueous solution of the same and then slowly adding said aqueous solution of ammonium fluoride to an aqueous solution of sodium sulfate and aluminum sulfate to form cryolite and ammonium sulfate, separating said cryolite from said ammonium sulfate, drying said ammonium sulfate and reacting said ammonium sulfate with fresh amounts of fluorspar to produce more ammonium fluoride.

References Cited in the file of this patent

UNITED STATES PATENTS

| Number | Name | Date |
|---|---|---|
| 582,928 | Mills | May 18, 1897 |
| 969,381 | Loesekann | Sept. 6, 1910 |

OTHER REFERENCES

Mellor's "Modern Inorganic Chemistry," New Impression of the Eighth Edition, January 1935, page 657, Longmans, Green and Co., N. Y.